(No Model.)
J. W. KING.
WIRE STRETCHER.
No. 425,805. Patented Apr. 15, 1890.
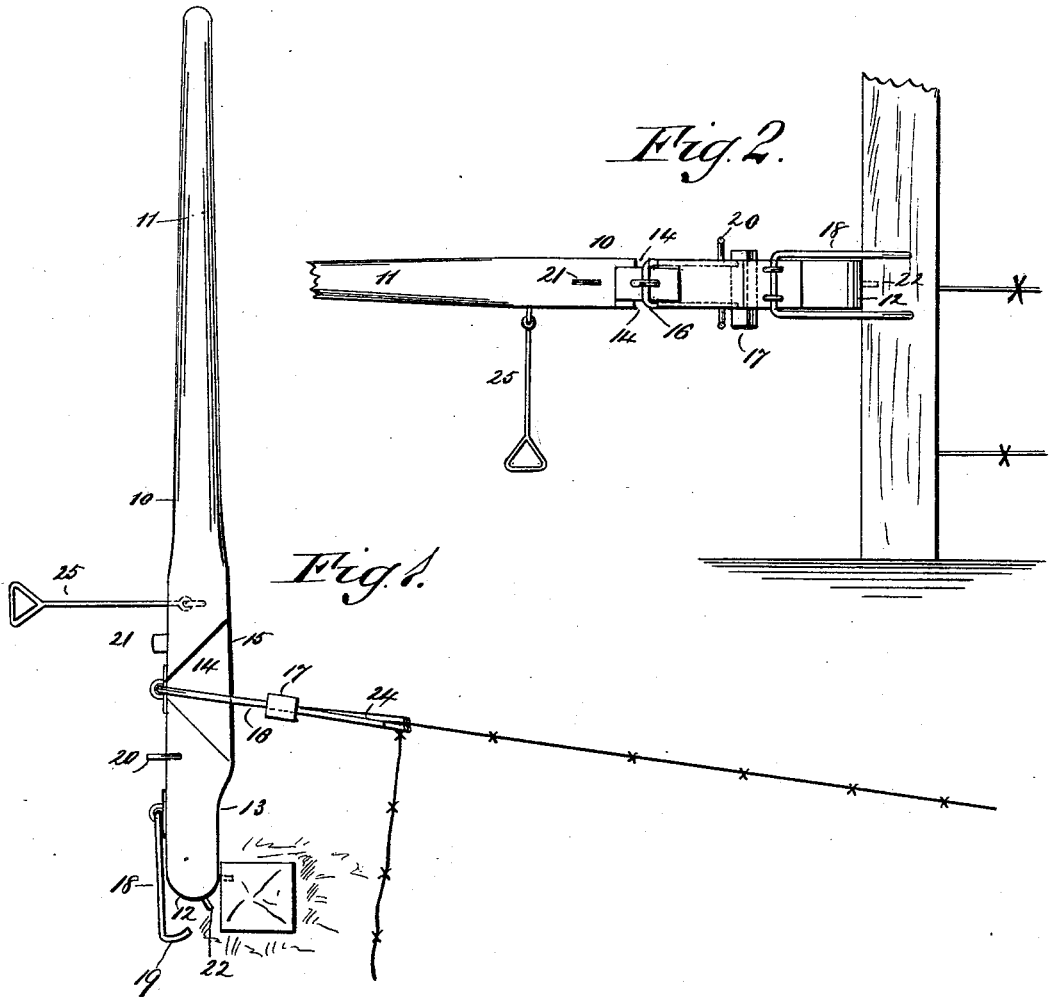
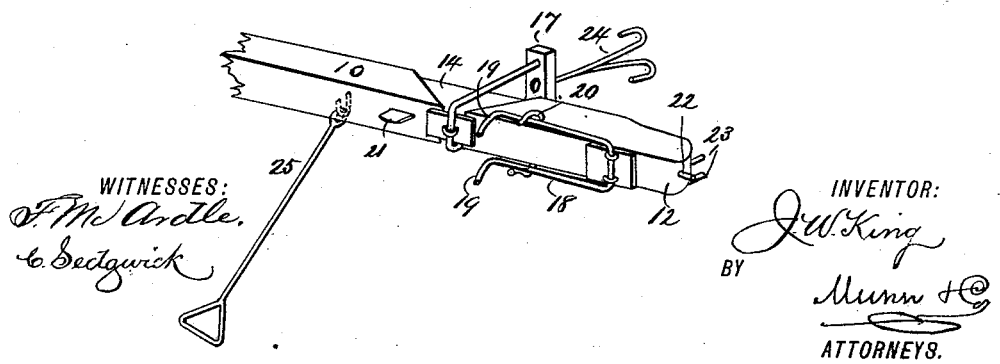
WITNESSES:
F. McArdle.
C. Sedgwick.
INVENTOR:
J. W. King
BY
Munn & Co.
ATTORNEYS.

UNITED STATES PATENT OFFICE.

JOHN W. KING, OF BUENA VISTA, TENNESSEE.

WIRE-STRETCHER.

SPECIFICATION forming part of Letters Patent No. 425,805, dated April 15, 1890.

Application filed December 12, 1889. Serial No. 333,439. (No model.)

*To all whom it may concern:*

Be it known that I, JOHN W. KING, of Buena Vista, in the county of Carroll and State of Tennessee, have invented a new and useful Improvement in Wire-Stretchers, of which the following is a full, clear, and exact description.

My invention relates to an improvement in wire-stretchers, and serve as for its object to provide a device of simple, durable, and economical construction, portable and capable of convenient manipulation.

The invention consists of the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the device, illustrated as in position for stretching the wire. Fig. 2 is a side elevation, and Fig. 3 is a perspective view of that portion of the device having attached gripping-arms and wire-retaining hooks.

The body of the device consists of a lever 10, one end of which serves as a handle, as illustrated at 11, and the other end is flattened or essentially rectangular in cross-section. The extremity of the said flattened end is rounded, as illustrated at 12 in Figs. 1 and 3. The inner side of the flattened end of the lever, at the rounded extremity of the same, is preferably cut away, as at 13. In the top and bottom faces of the rectangular portion of the lever triangular recesses 14 are produced, the recess upon the under side being in vertical alignment with the recess upon the upper side, so that the bases of said recesses 14 are in line on the inner side 15 of the lever. Upon the outer side of the lever, at the apex of the triangular recesses 14, a yoke 16 is pivoted, the members whereof extend inward and are connected by a bar 17 in any suitable or approved manner. The yoke 16 is so pivoted upon the lever that it will swing in the triangular recesses 14 the length of the bases of said recesses on the side 15.

Upon the outer side of the lever, near the rounded end of the same, a U-bar 18 is pivoted, the extremities of the members of which bar are bent at a right angle outward to form hook-like teeth 19, as illustrated in Fig. 3. This toothed or hooked U-bar is so pivoted upon the lever that when it is carried outward the hooked extremity will extend beyond the rounded end of the lever, as illustrated in Fig. 1. Normally this hook-like U-bar is folded back upon the lever and held in position by means of a pivotal clamp 20, as best illustrated in Fig. 3.

Near the pivotal point of the yoke 16 a cutter 21 is inserted in the lever, and in the rounded end of the said lever one or more teeth or pins 22 are inserted, and at or near the junction of the said rounded end surface with the concave wall of the cut-away portion 13 two or more similar teeth or pins 23 are fixed. To the center of the bar 17, connecting the members of the pivotal yoke 16, a twin hook 24 is secured, having the members forming the hook carried upward and outward in opposite directions, as shown in Fig. 3. Instead of the twin hook shown, two hooks having their shanks placed together may be employed. Upon one side face of the lever, between the handle portion and the recesses 14, a hand-bar 25 is hinged or pivoted.

In operation the lever is used horizontally, and if the wire to be stretched is a barbed wire it is passed through one of the hooks 24, while if the tape-wire is used it is passed through both of the said hooks, in order that a gripping-surface may be obtained. The wire to be stretched having been placed in contact with the hooks 24, the inner teeth or pins 23 are placed in contact with the side of the post at a right angle to that side upon which the wire is to be secured, as illustrated in Fig. 1. The U-bar carrying the teeth 19 is released from its clamp and thrown outward over the toothed rounded end of the lever. The handle of the lever is now grasped, and, if desirable, the bar 25 also. Using the post as a fulcrum, the lever is drawn outward, and when the teeth 23 leave the post the tooth or teeth 22 will obtain a hold. Thus the lever can be carried backward until the wire being stretched is brought into contact with the side of the post to which it is to be attached. When the wire thus comes in contact with the post, the teeth of the U-bar will be in engagement with the face of the post immediately opposite to that to which the wire is to be secured, and, holding the lever with one hand, the operator drives the teeth of the U-bar into the post, as shown in Fig. 2, whereby the lever is rigidly held at a right angle to the side upon which it is fulcrumed and parallel with the line of stretched wire, as is also illustrated in Fig. 2. The lever may now be safely released from the grasp of the operator and the wire nailed or clamped to the post in any approved manner. The cutter 21 may be brought into use to cut the wire, when so desired.

Two twisted or barb wires may be stretched at one movement of the lever by causing one wire to engage with each member of the twin hook 24; but, as heretofore stated, when the device is used in connection with tape-wire, one wire only can be stretched at one time, as the wire must engage both hooks.

Having thus described my invention, I claim as new and desire to secure by Letters Patent—

1. As an improved article of manufacture, a wire-stretcher consisting of a lever having one toothed end, a yoke pivoted upon one side of the lever, extending beyond the opposite side, hooks secured to said yoke, and a U-bar hinged or pivoted upon the side of the lever near the toothed end, having the outer extremities of its members bent to form teeth, substantially as shown and described.

2. In a wire-stretcher, the combination, with a lever having one end formed into a handle and the other extremity provided with teeth, of a yoke pivoted upon one side of the lever near the toothed end, hooks secured to the said yoke, a U-bar pivoted at the toothed end of the lever, adapted to project over and beyond the same and having its extremities formed into teeth, and a hand-bar hinged to one side of the lever, all combined for operation substantially as shown and described.

3. In a wire-stretching device, the combination, with a lever having one end formed as a handle and the other end rounded and toothed and provided with recesses in two opposed faces, of a yoke pivoted upon the lever, adapted to have lateral movement in the recesses and having its members connected by a cross-bar, hooks pivoted in said cross-bar, a U-bar pivoted upon one side of the lever near the toothed end, having its extremities formed into teeth adapted to project beyond the said toothed end, and a clamp adapted to engage the U-bar, all combined for operation substantially as shown and described.

4. In a wire-stretching device, the combination, with a lever having one end formed as a handle and the other end rounded and toothed and provided with recesses in two opposed faces, of a yoke pivoted upon one side of the lever, capable of lateral movement in the recesses thereof, a bar connecting the members of the yoke, hooks rigidly secured to the said bar, a U-bar pivoted upon one side of the lever near the toothed extremity, having the ends of its members formed into teeth, a clamp adapted to engage the said U-bar, a cutter projected from the lever adjacent to the pivotal point of the yoke, and a hand-bar hinged or pivoted to one side of the lever between the handle portion and the recesses in the body of the lever, substantially as and for the purpose specified.

JOHN W. KING.

Witnesses:
W. F. MOODY,
EMMA BOYD.